June 5, 1962  W. GILLESPIE, JR., ETAL  3,038,077
INFRARED SCANNER

Filed Nov. 18, 1959  3 Sheets-Sheet 1

INVENTORS
WARREN GILLESPIE, JR.
NORMAN M. HATCHER
ROBERT J. GUILLOTTE

BY

ATTORNEYS

June 5, 1962   W. GILLESPIE, JR., ETAL   3,038,077
INFRARED SCANNER
Filed Nov. 18, 1959   3 Sheets-Sheet 2
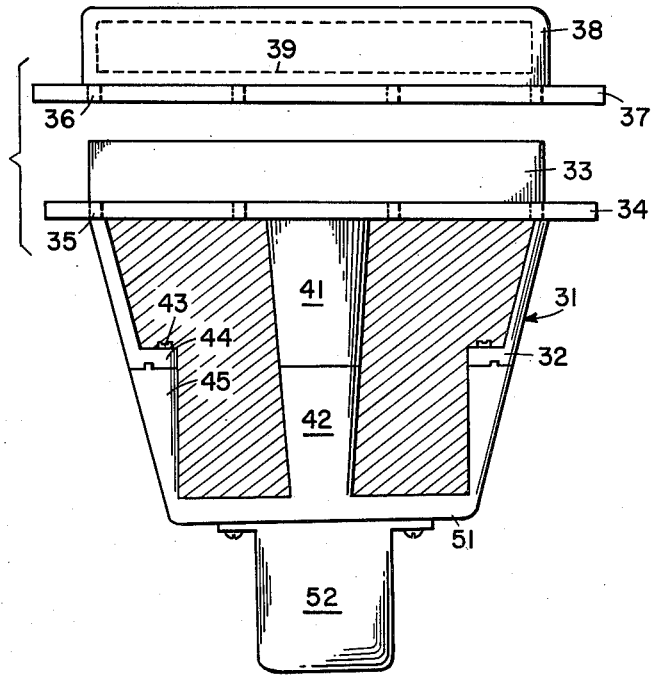
FIG. 3
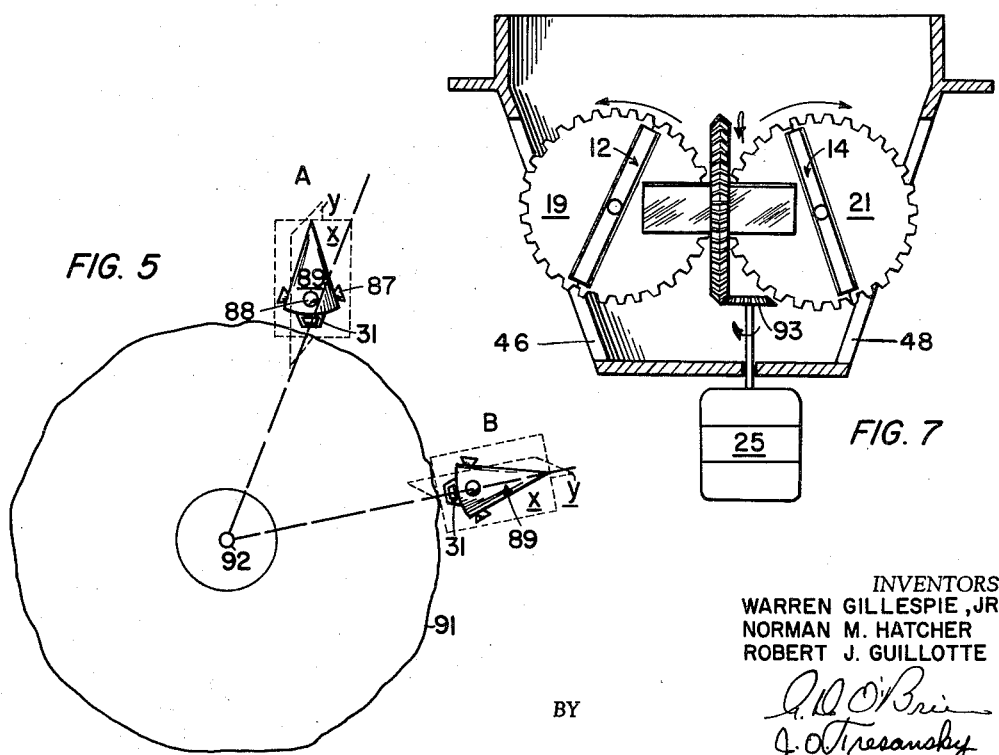
FIG. 5
FIG. 7
INVENTORS
WARREN GILLESPIE, JR.
NORMAN M. HATCHER
ROBERT J. GUILLOTTE
BY
ATTORNEYS

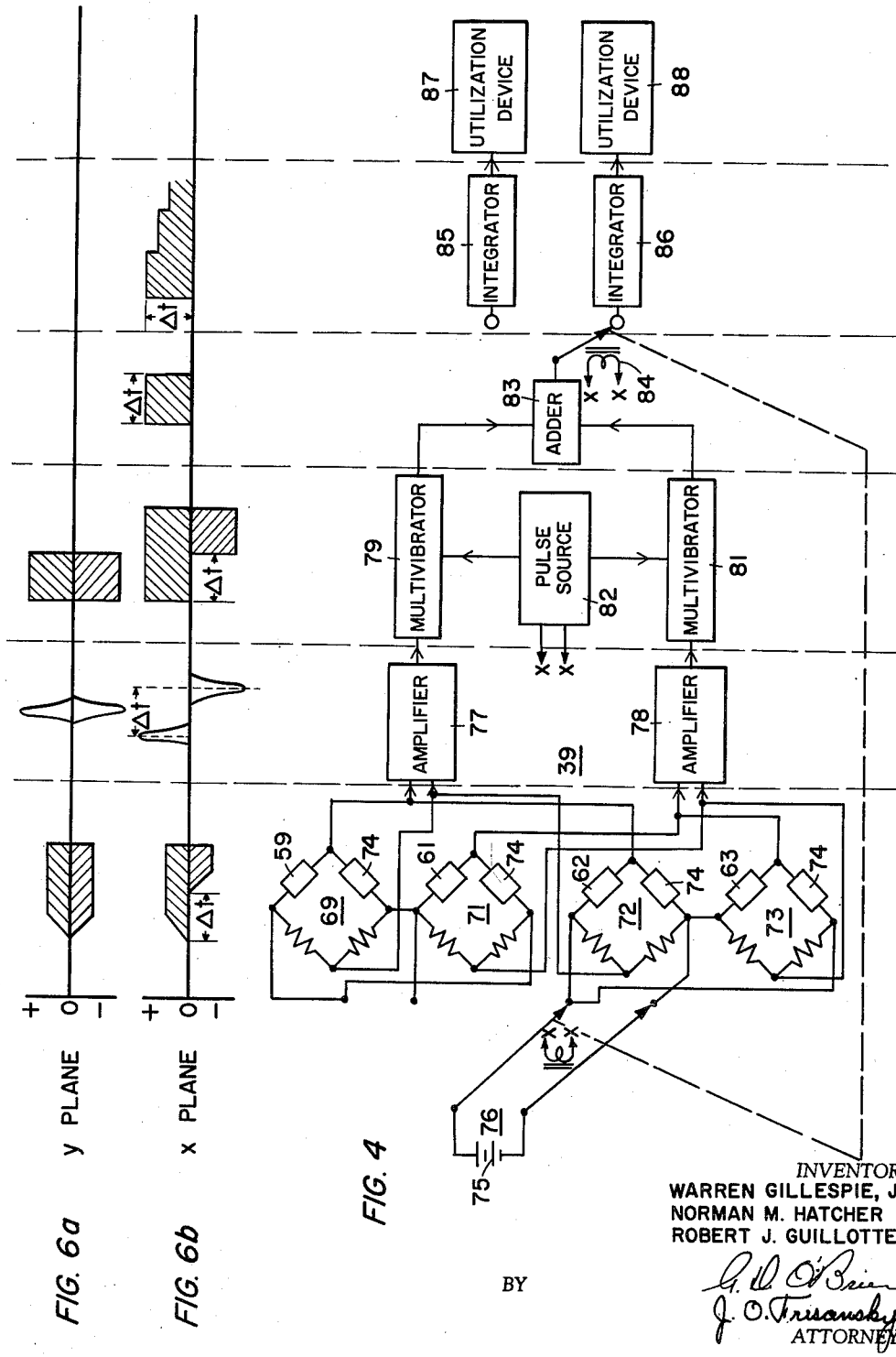

United States Patent Office 3,038,077
Patented June 5, 1962

3,038,077
INFRARED SCANNER
Warren Gillespie, Jr., Newport News, and Norman M. Hatcher and Robert J. Guillotte, Hampton Va., assignors to the United States of America as represented by the Administrator of National Aeronautics and Space Administration
Filed Nov. 18, 1959, Ser. No. 853,984
23 Claims. (Cl. 250—83.3)
(Granted under Title 35, U.S. Code (1952), sec. 266)

The invention described herein may be manufactured and used by or for the Government of the United States of Amereica for governmental purposes without the payment of any royalties thereon or therefor.

This invention relates generally to radiation responsive scanners, and more particularly to an infrared energy radiation responsive scanning system for determining the orientation of an aerial or space vehicle relative to the earth.

Although aircraft orientation systems have been heretofore devised, such for example as those operating on gravitational, inertial and stellar guidance principles, in general, these prior art systems have been found to be unsuitable for use in a small sized space vehicle, such for example as an orbiting capsule for a sole occupant, by reason of their inherent relatively large sizes, weights and electrical power requirements. Moreover, in the present state of the art, these prior art systems have not been found to be practically suited for efficiently determining the magnitude of deviation of a space craft's longitudinal axis from perfect alignment with the earth's center. In order to accomplish this mission, horizon scanning devices which are capable of selectively detecting the infrared energy radiations emitted by the earth's troposphere have been proposed. Inasmuch as any body emits radiation at a rate proportional to the fourth power of its absolute temperature, the top of the earth's troposphere, being in a temperature range of 200 degrees K. to 250 degrees K., emits a substantially larger amount of radiation that that emitted by space, at a temperature of about 4 degrees K. This radiation can be readily detected and utilized by infrared responsive scanners to determine and adjust the orientation of a space craft relative to earth. In one present day horizon scanner, a conical scan mode is utilized for detecting infrared radiations emitted by the troposphere. The detected radiations are then compared with an internally generated reference signal to obtain the direction and magnitude of deviation. Although this horizon scanner operates satisfactorily, the conical scan is only in one plane, thereby necessitating the use of two units quadrature mounted on the space craft to effect complete orientation thereof. In another present day horizon scanner, a circular scan having a superimposed vertical oscillation is employed to intermittently sample and compare the troposphere-space radiation discontinuity to develop a suitable orientation error signal. In view of the complicated scan mode utilized, this device is relatively bulky and heavy.

Accordingly, it is an object of the present invention to provide a novel orientation determining device.

Another object of this invention is to provide a new and improved radiation responsive orientation indicator.

Still another object of the instant invention is to provide a new and improved horizon scanning apparatus.

A further object of this invention is to provide a novel infrared energy sensitive orientation correcting system for a space vehicle.

A still further object of the present invention is the provision of a relatively compact and lightweight two plane optical scanning head.

Another still further object of the present invention is to provide a novel infrared responsive control system for accurately and rapidly adjusting the orientation of a space satellite.

According to the present invention, the foregoing and other objects are attained by providing means for alternately detecting the emitted infrared radiations in two mutually perpendicular planes, means for converting the detected radiations into electrical signals, means for developing control signals representative of the magnitude and direction of misalignment correlative to the time differences between radiation interceptions in the two scanned planes, and means for developing thrusts in response to the developed control signals.

A more complete appreciation of the invention and many of the attendant advantages thereof will be readily appreciated as the same becomes better understood by reference to the following detailed description when considered in connection with the accompanying drawings wherein:

FIG. 3 is a side external view of the overall horizon scanner;

FIG. 4 is a block diagrammatic view of the signal processing circuit associated with the optical head;

FIG. 5 is a pictorial illustration of one application of the horizon scanner of this invention;

FIGS. 6a and 6b illustrate the waveforms of signals developed by the signal processing circuit during a typical operational situation; and, FIG. 7 is a side view of an alternative embodiment of the optical head of FIGS. 1 and 2.

Figure 1:
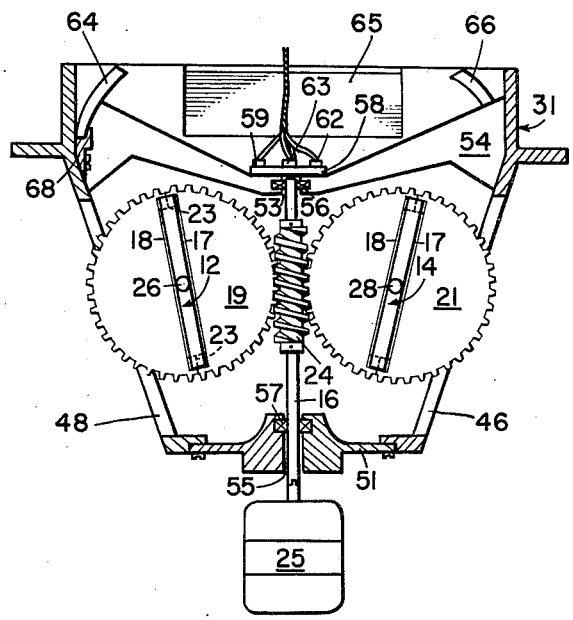
FIG. 1 is a vertical fragmentary section view of the optical head.
Figure 2:
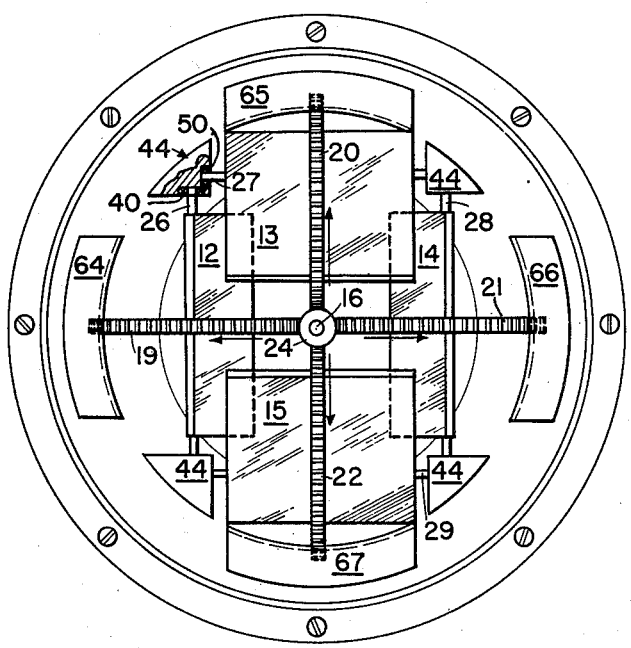
FIG. 2 is a top fragmentary view of the optical head.

Referring now to the drawings wherein like reference numerals designate identical or corresponding parts throughout the several views, and more particularly to FIGS. 1 and 2, the optical head of the horizon scanner of the present invention is shown as consisting of four substantially square-shaped plate members 12, 13, 14 and 15 equidistantly positioned about a shaft 16. Mirrored surfaces 17 and 18 are formed on both square planar faces of each of the plate members. Mirrored members 12, 13, 14 and 15 are mounted within gears 19, 20, 21 and 22. The gears are joined together half sections positioned within a notch 23 formed centrally of the top and bottom faces of the mirrors perpendicular to the mirror faces thereof. Each of the gears is substantially at a 90 degree angle to its adjacent gears. The gears extend radially outward from the shaft 16 and mesh with a worm 24 secured thereupon. Alternate pairs of mirrors are arranged to rotate 90 degrees apart over the scan cycle, thereby allowing them to intermesh and form a compact mirror configuration. By this arrangement, the alternate pairs of mirrors scan mutually perpendicular planes in sequence. The lower end of shaft 16 is secured to the armature of an electric drive motor 25. By way of example, and not limitation, the motor may rotate the shaft at 300 r.p.m. Each of mirrored members 12, 13, 14 and 15 is mounted upon a rotatable shaft, designated by reference numerals 26, 27, 28 and 29, respectively, within a housing 31.

As more clearly shown in FIG. 3, the optical head package 31 is composed of a lower frusto-conical section 32 and an upper relatively narrow cylindrical section 33. An external flange 34 is integrally formed on the housing at the junction of the upper and lower sections thereof. The flange 34 is provided with clearance holes 35 which align with clearance holes 36 of a flange 37 formed on a cylindrical container 38 wherein is disposed the electronic circuitry 39 associated with the optical head. As shown, the lower housing section 32 is formed of two segments 41 and 42 joined together by bolts 43 engaging a flange 44 formed on segment 41 and protuberances 45 formed on segment 42. The conical section 32 is provided with four equidistantly spaced windows, or openings of substantially identical size, two of which, 46 and 48, are shown in FIG. 1. These openings serve to admit the radiation to be detected by the mirrors of the optical head. The windows are preferably square-shaped and extend substantially along the entire length of the conical surface. Secured to the base member 51 of the housing is a container 52 wherein the motor 25 is disposed.

Referring back to FIGS. 1 and 2, the mirror support shafts 26, 27, 28 and 29 are shown as being journalled between recesses formed in flange 44 and protuberances 45, while drive shaft 16 is journalled in a recess 53 formed centrally of a spider support 54 and in the collar of a longitudinal bore 55 formed centrally of base member 51. Suitable bearings 40, 50, 56 and 57 may be provided for the mirror and drive shafts. Seated upon the spider 54 is a tray 58 whereon four thermistor bolometer detectors 59, 62 and 63, and one which is not shown, are positioned. A plurality of parabolic reflectors 64, 65, 66 and 67 are secured to the inner side of the upper housing section 33 above each of the windows by conventional means, such for example as brackets 68. Each of the parabolic reflectors is designed to focus off axis, radiation reflected upon it by its associated mirror to one of the detectors; namely, parabolic reflector 64 will focus the radiation reflected by mirror 12 upon detector 59.

Each of detectors 59, 61, 62 and 63 is connected in one arm of a conventional Wheatstone bridge, designated by reference numerals 69, 71, 72 and 73, respectively, of the signal translating circuit 39. As shown in FIG. 4, the Wheatstone bridges may also be provided with individual shielded thermistor detectors 74 to compensate for resistance variations in the active detectors from temperature changes. Suitable energizing potential is provided for the bridges from a common unidirectional energy source, such for example as battery 75 through a double pole circuit switching relay 76. The movable arms of the relay switch are connected to opposite terminals of battery 75. In one position, the relay switch simultaneously provides energizing potential of opposite polarity to bridges containing detectors responsive to the radiations impinging upon one of the mirror pairs, and in the other position, to the bridges containing detectors responsive to the radiations impinging upon the other pair of mirrors.

Wheatstone bridges 69 and 72 are connected to amplifier 77, while bridges 71 and 73 are connected to amplifier 78. These amplifiers are of the conventional type which develop an output impulse signal immediately in response to the application of an input signal thereto, the polarity of the output signal corresponding to the polarity of the input signal. Amplifiers 77 and 78 are individually coupled to multivibrators 79 and 81, respectively. The multivibrators may be of the Eccles-Jordan type which execute an alternation for each triggering impulse applied and remain in that condition until reset to its initial condition by a second triggering impulse. The reset impulses for the multivibrators may be obtained from a pulse source 82 which may be a conventional pulse generator which provides a train of impulse signals at a predetermined constant time interval, or an electrical circuit adapted to be intermittently energized by the revolving mirrors. The square wave output signals of the multivibrators are applied to a conventional adder circuit 83 which develops an output error signal of a duration and polarity corresponding to the algebraic difference between the applied square wave signals. The adder circuit 83 is coupled through a conventional double pole circuit switching relay 84, ganged for movement in unison with relay switch 76, to one of two integrating networks 85 and 86, which develop control signals of a magnitude and polarity corresponding to the duration of the error signal. The control signal from each integrator is applied to individual electro-responsive correction devices, such for example as small thrust producing jet motors 87 and 88. The circuit switching relays may be operated by the periodic impulses developed by pulse generator 82, which impulses may be timed to occur for every 90 degrees of scanning mirror rotation.

For the purpose of providing a greater appreciation for the radiation scanning system of the present invention, the operation thereof as a horizon scanner on an orbiting space capsule will now be described in relation to FIGS. 5 and 6. In FIG. 5, the horizon scanner 31 is shown as being secured to the underside of a space capsule 89 orbiting the earth above the troposphere 91. The horizon scanner is centrally positioned about the longitudinal axis of the capsule, which it is desired to maintain in radial alignment with the earth's center 92. In position A, the capsule axis is shown as being mis-aligned in the X plane relative to an imaginary radial line from the point 92. Consequently, as motor 25 drives gears 19, 20, 21 and 22 through worm gear 24, alternate scanning of the X and Y planes will be effected by the revolving mirror pairs 12, 14 and 13, 15, respectively. Inasmuch as each of the mirrors has two opposite mirror surfaces, each mirror will scan twice during each revolution. The scan arc is basically dependent upon the relative positioning of the mirrors and their associated parabolic reflectors, as well as the size of the windows. Since the capsule 89 is properly oriented in the Y plane, mirrors 13 and 15 will simultaneously detect the infrared radiations, and as shown in FIG. 6a, the electrical signals developed by the associated detectors 61 and 63 at the output of bridges 71 and 73 will occur simultaneously. The impulses generated by amplifiers 77 and 78 will also occur simultaneously, thereby resulting in the simultaneous initiation of square wave signals by multivibrators 79 and 81. When the reset pulse is applied to the multivibrators, the signals will terminate. Since the square wave signals are of identical duration, no output error signal will be developed by adder 83. Accordingly, integrating network 86 will not generate a control signal for actuating jets 88 to produce a suitable correction thrust in the Y plane. However, when mirrors 12 and 14 are in scan position, and switches 76 and 84 have energized bridges 69 and 72, infrared energy will be impinge upon one mirror; i.e., for descriptive purposes, mirror 12, before the other mirror, and upon reflection by parabolic reflector 64 on to detector 59, the output signal of Wheatstone bridge 69 will precede that of bridge 72 by $\Delta t$, as shown in FIG. 6b. In this instance, the impulses generated by the amplifiers, and the square wave signals produced by the multivibrators will not coincide in time, and an error signal will be developed by adder 83. The error signal will be transmitted to integrator 85 whereupon a control signal will be applied to jets 87 for producing a corresponding magnitude correction thrust in the X plane. As the capsule approaches a perfectly aligned position, the amplitude of the control signal developed by integrator 85 in response to subsequent scans of the X plane will diminish, until, as shown in position B the capsule 89 is perfectly oriented, and no control signal is developed for actuating the jets 87.

If a more rapid scanning rate is desired, such for example as one of about 600 r.p.m., a more suitable driving arrangement is illustrated in FIG. 7 of the drawings. In this arrangement, gears 19, 20, 21 and 22 are intermeshing miter gears beveled at a 45 degree angle on both sides and a pinion 93 is mounted upon the drive shaft to mesh with one of the miter gears to effect rotation of the entire scanning mirror assembly.

Obviously numerous modifications and variations of the present invention are possible in the light of the above teachings. It is therefore to be understood that within the

What is claimed as new and desired to be secured by Letters Patent of the United States is:

1. A scanning system for use with a flying object to determine the angular relation of its reference axis to a reference line passing perpendicularly through an imaginary reference plane between a first zone of low energy radiation and a second zone of high energy radiation, comprising: a pair of radiation scanners carried by said object in symmetrical arrangement at opposite sides of its reference axis; means to sweep the scan axes of said scanners in a plane containing said reference axis and in opposite directions in synchronous angular relation to said reference axis through a first one of said zones into a second one of said zones; separate radiant energy detecting means for each scanner, sensitive to variations in intensity of radiant energy, to detect the instant of transit of its scan axis from said first zone to said second zone; and means to produce a signal output representing the time interval between the respective transits of said two scan axes and thereby the angular departure of said reference axis from said reference lines.

2. A radiation scanning system, comprising: a support; a plurality of pairs of mirrors rotatably mounted on said support; motor means for constantly and uniformly rotating said mirrors; the mirrors of each pair being arranged in a common plane, and each pair of mirrors being arranged in a different plane with all planes passing through the same axis; each pair of mirrors being adapted to sequentially detect energy radiations of different levels in different zones of its plane of scan; transducer means individual to each of said mirrors for developing an electrical signal in response to the radiation detected by the respective mirror; optical means individual to each of said mirrors for reflecting the detected radiation onto the respective transducer means; and circuit means responsive to the electrical signals developed by said transducer means for sequentially producing an output signal for each of said pairs of mirrors representative of the time interval between detections of energy of the same level by the constituent mirrors thereof.

3. A radiation scanning system according to claim 2 wherein said pairs of rotating mirrors are mutually perpendicular to each other.

4. A radiation scanning system according to claim 2 wherein said transducer means are thermistor detector circuit elements.

5. A radiation scanning system according to claim 2 wherein said optical means are parabolic reflectors.

6. A radiation scanning system comprising a casing having at least one pair of diametrically opposite openings formed in the side wall thereof, a plane mirror rotatably mounted within said casing adjacent each of said openings, diametrically opposite pairs of plane mirrors detecting energy radiations in individual planes, means in said casing for effecting rotation of said mirrors, transducer means disposed in said casing individual to each of said mirrors for developing an electrical signal in response to the detection of radiation thereby, optical means disposed in said casing individual to each of said mirrors for focusing the detected radiation on to the respective transducer means, and circuit means responsive to the electrical signals developed by said transducer means for alternately producing an output signal for each of said pairs of mirrors corresponding to the time interval between the radiations detected by the diametrically opposite constituent mirrors thereof.

7. A radiation scanning system according to claim 6 wheerin said openings are of identical configuration.

8. A radiation scanning system according to claim 6 wherein the side wall of said casing is inclined.

9. A radiation scanning system according to claim 6 wherein said optical means are parabolic reflectors.

10. A radiation scanning system according to claim 7 wherein each of the plane mirrors are of identical configuration.

11. A radiation scanning system according to claim 10 wherein said openings and said plane mirrors are of a substantially square configuration.

12. A radiation responsive system comprising a plurality of rotating mirrors, alternate ones of which constitute mirror pairs for sequentially intercepting energy radiations emanating in divers planes, transducer means individual to each of said mirrors for developing an electrical signal in response to the interception of radiation thereby, optical means individual to each of said mirrors for reflecting the intercepted radiation upon the respective transducer means, an electrical bridge coupled to each of said transducer means for providing an output signal upon development of an electrical signal by the respective transducer means, circuit means for oppositely energizing the pair of electrical bridges coupled to the transducer means of each of said mirror pairs thereby resulting in opposite polarity signals therefrom, and circuit means sequentially connectable to each pair of said electrical bridges for sequentially producing a resultant signal for each of said mirror pairs correlative to the time difference between the radiations intercepted by the constituent mirrors thereof.

13. A radiation scanning head caomprising a casing having at least one pair of apertures formed on diametrically opposite sides thereof, a shaft rotatably mounted in said casing coincident with the longitudinal axis thereof, a worm affixed to said shaft, an electric motor coupled to said shaft to effect rotation thereof, a pllurality of scanning mirrors rotatably mounted in said casing equidistantly about said shaft and each being adjacent to one of said apertures, a segmented gear encircling each of said mirrors, each gear being in operative engagement with said worm gear for effecting rotation of its respective mirror, a transducer element for each of said mirrors disposed in said casing, and a parabolic reflector individual to each of said mirrors and its respective transducer element disposed in said casing.

14. A radiation scanning head according to claim 13 wherein the side wall of said casing is inclined.

15. A radiation scanning head according to claim 13 wherein said casing is of a substatnially frusto-conical configuration.

16. A radiation scanning head according to claim 13 wherein said scanning mirrors have mirrored surfaces on two opposite faces thereof.

17. A radiation scanning head comprising a substantially frusto-conical casing having two pairs of mutually perpendicular windows formed on diametrically opposite sides thereof and an aperture formed centrally of the bottom thereof, a vertical shaft rotatably disposed in said aperture, a worm gear secured to said shaft, an electric motor coupled to said shaft to effect rotation thereof, two pairs of mutually perpendicular plate members having mirrored surfaces formed on two opposite sides pivotally mounted in said casing equidistantly about said shaft, each of said members being adjacent and substantially parallel to one of said windows, a segmented gear perpendicularly encircling each of said members and being in meshing engagement with said worm gear for effecting rotation of its respective member, a transducer element for each of said members positioned centrally of said casing above said shaft, a spider framework secured to said casing for supporting said transducer elements and said shaft, and a parabolic reflector secured to said casing above each of said windows for reflecting the radiation impinging upon one of said members on to one of said transducer elements.

18. A radiation scanning head according to claim 17 wherein the mirrored surfaces of one of said pair of members is displaced 90 degrees relative to the mirrored surfaces of the other of said pair of members.

19. A radiation scanning head comprising a substantially frusto-conical casing having two pairs of mutually perpendicular windows formed on diametrically opposite sides thereof, a plurality of two-faced scanning plane mirrors pivotally mounted in said casing equidistantly from the longitudinal axis thereof, a segmented miter gear perpendicularly encircling each of said mirrors, each gear being beveled on both sides to effect a meshing engagement therebetween, a motor driven pinion meshing with one of said miter gears, a transducer element for each of said mirrors disposed in said casing, and a parabolic reflector individual to each of said mirrors and its respective transducer element disposed in said casing.

20. In combination with a space satellite, an orientation correction system comprising a casing affixed to the satellite coincident with the longitudinal axis thereof, two pairs of mutually perpendicular apertures formed on diametrically opposite sides of said casing, rotating plane mirrors pivotally mounted in said casing adjacent to each of said apertures, alternate mirrors forming scanning pairs for intercepting infrared radiations existing in mutually perpendicular planes in alternate sequence, transducer means disposed in said casing for developing electrical signals in response to radiations intercepted by said mirrors, parabolic reflector means disposed in said casing for focusing the intercepted radiations on to said transducer means, circuit means responsive to the electrical signals developed by said transducer means for producing in said alternate sequence output signals for each scan pair representative of the time difference between radiations intercepted by the constituent mirrors of each scan pair, and a pair of reaction motor means mounted on the satellite for generating thrusts in said mutually perpendicular planes in response to output signals to selectively vary the orientation of the satellite.

21. A radiation scanning head comprising: a casing having a longitudinal axis and a peripheral wall thereabout; a pair of windows in said wall at diametrically opposed loci; a mirror in said casing adjacent each window; each mirror being mounted in said casing for rotation about an axis in a plane at right angles to said longitudinal axis and laterally spaced therefrom, said axes of rotation being parallel to each other; means to continuously rotate said mirrors; said mirrors being adapted to detect radiant energy through said windows from zones of varying energy intensity spaced in a plane containing the longitudinal axis of said casing; transducer means individual to each of said mirrors located in said casing; and reflector means individual to each of said mirrors effective to reflect radiant energy from each mirror to its associated transducer means.

22. A radiation scanning system according to claim 6 wherein said means for effecting rotation of said mirrors provides for a continually constant rotational speed.

23. An orientation correcting system according to claim 20 wherein said rotating plane mirrors operate at a continually constant rotational rate.

References Cited in the file of this patent

UNITED STATES PATENTS

| 2,703,505 | Senn | July 3, 1948 |
| 2,855,521 | Blackstone | Oct. 7, 1958 |
| 2,873,381 | Lauroesch | Feb. 10, 1959 |
| 2,897,369 | Ketchledge | July 28, 1959 |
| 2,947,872 | Carbonara et al. | Aug. 2, 1960 |
| 2,964,265 | Ketchledge | Dec. 13, 1960 |